United States Patent
Negel et al.

(10) Patent No.: US 9,643,532 B2
(45) Date of Patent: May 9, 2017

(54) METHOD FOR PRODUCING A LIGHT FOR VEHICLES AND EXTERIOR MIRROR ASSEMBLY OF A VEHICLE WITH A LAMP THUS PREPARED

(71) Applicant: SMR Patents S.à.r.l., Luxembourg (LU)

(72) Inventors: Raimund Negel, Unterensingen (DE); Arne Schmierer, Kirchheim/Teck (DE); Daniel Fritz, Stuttgart (DE)

(73) Assignee: SMR PATENTS S.A.R.L., Luxembourg (LU)

( * ) Notice: Subject to any disclaimer, the term of this patent is extended or adjusted under 35 U.S.C. 154(b) by 0 days.

(21) Appl. No.: 15/052,120

(22) Filed: Feb. 24, 2016

(65) Prior Publication Data
US 2016/0243737 A1 Aug. 25, 2016

(30) Foreign Application Priority Data
Feb. 24, 2015 (EP) .................................... 15156407

(51) Int. Cl.
*B29C 45/00* (2006.01)
*B60Q 1/04* (2006.01)
(Continued)

(52) U.S. Cl.
CPC ................ *B60Q 1/34* (2013.01); *B29C 45/16* (2013.01); *B29D 11/00663* (2013.01); *B29D 11/00682* (2013.01); *B60Q 1/2665* (2013.01); *B60R 1/1207* (2013.01); *F21S 48/215* (2013.01); *F21S 48/2237* (2013.01); *F21S 48/2243* (2013.01); *F21S 48/2268* (2013.01);
(Continued)

(58) Field of Classification Search
CPC .............. F21S 48/1241; F21S 48/2243; F21S 48/2268; B29C 48/14467; G02B 6/1221; G02B 6/1223; G02B 6/0065
See application file for complete search history.

(56) References Cited

U.S. PATENT DOCUMENTS 8,820,990 B2    9/2014   Wegner et al.
2011/0013411 A1*   1/2011   Sakiyama ............ B60Q 1/2665
                                                                                                        362/494

FOREIGN PATENT DOCUMENTS

DE    102008044357 A1    6/2009
DE    102011106595 A1    12/2012
(Continued)

*Primary Examiner* — Karabi Guharay
(74) *Attorney, Agent, or Firm* — MacMillan, Sobanski & Todd, LLC

(57) ABSTRACT

A method for manufacturing a lamp for vehicles is disclosed in which a housing, a light conductor, and a clear lens are produced as one unit out of plastic in a 3-component injection procedure. The refractive index of the plastic of the clear lens is selected to be different from the refractive index of the plastic of the light conductor. The boundary between clear lens and the light conductor adjacent to it is formed with a structure. Because of the difference of the two refractive indexes and the structure at the given light admission on at least one light incoupling area at one end of the light conductor, light outcoupling areas are defined along the extent of the light conductor and out of the lamp. The invention furthermore relates to a side-view mirror arrangement of a vehicle having a lamp manufactured in this manner, preferably in the form of a blinker.

10 Claims, 2 Drawing Sheets

Figure 4:
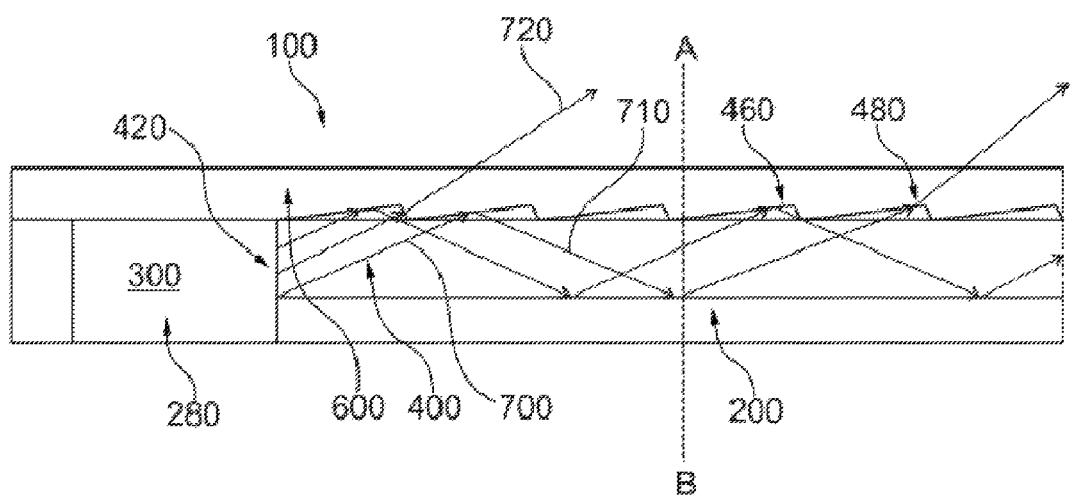

(51) Int. Cl.
*B60Q 1/34* (2006.01)
*F21S 8/10* (2006.01)
*B60R 1/12* (2006.01)
*B29C 45/16* (2006.01)
*B29D 11/00* (2006.01)
*B60Q 1/26* (2006.01)
*B29L 11/00* (2006.01)
*B29L 31/00* (2006.01)
*F21V 8/00* (2006.01)

(52) U.S. Cl.
CPC ............... *B29K 2995/0031* (2013.01); *B29L 2011/0016* (2013.01); *B29L 2031/747* (2013.01); *B60Q 1/2696* (2013.01); *G02B 6/0038* (2013.01); *G02B 6/0065* (2013.01)

(56) References Cited

FOREIGN PATENT DOCUMENTS

EP 2407346 A1 1/2012
EP 2525138 A1 11/2012

\* cited by examiner

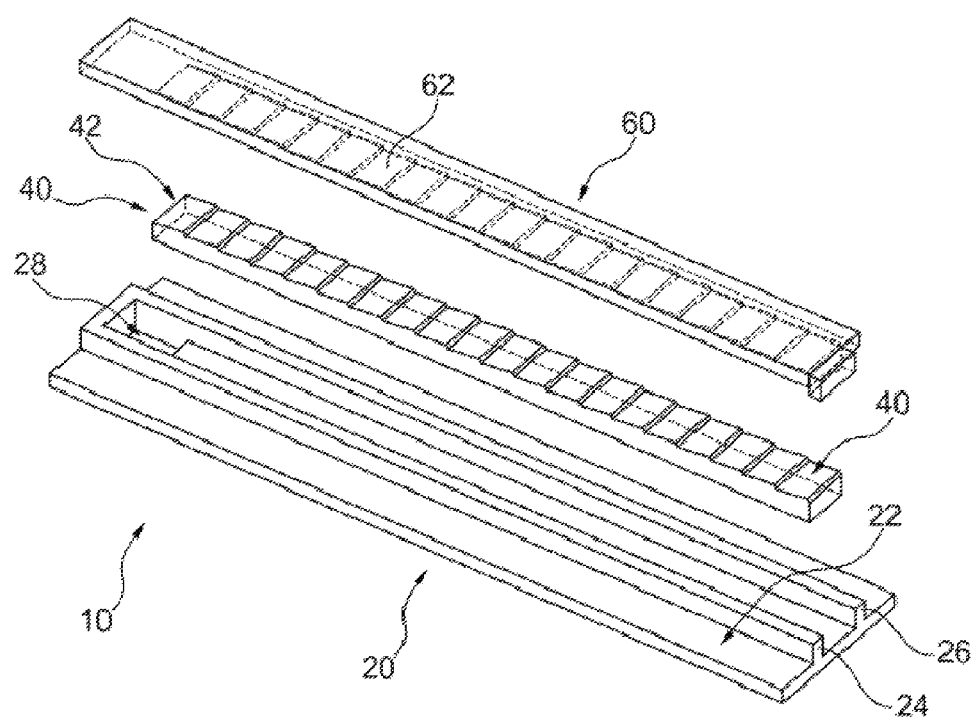
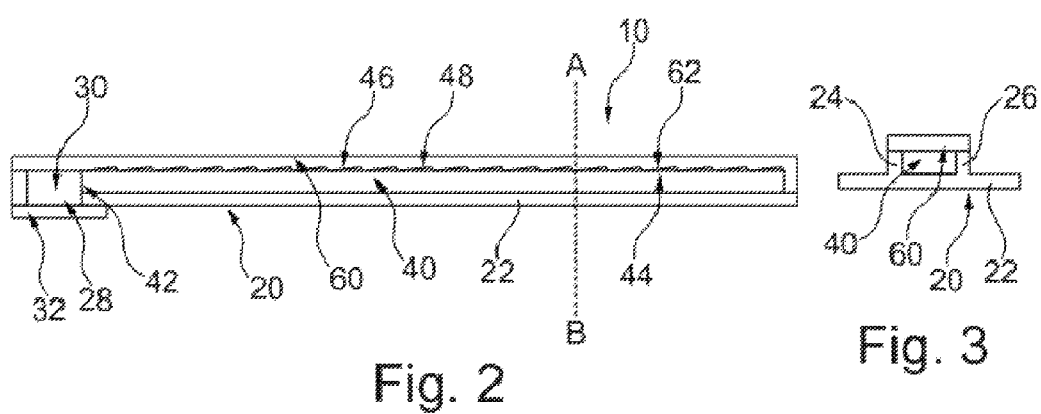

METHOD FOR PRODUCING A LIGHT FOR VEHICLES AND EXTERIOR MIRROR ASSEMBLY OF A VEHICLE WITH A LAMP THUS PREPARED

CROSS-REFERENCE TO RELATED APPLICATIONS

This application claims priority from European Patent Application No. 15156407.7, filed Feb. 24, 2015, the disclosure of which is incorporated herein by reference.

DESCRIPTION

The present invention relates to a method for manufacturing a lamp for vehicles and a side-view mirror arrangement of a vehicle having a lamp manufactured in this manner, preferably in the form of a blinker.

A lamp for vehicles, especially for their side-view mirror arrangements, is known from EP 1 657 488 B1. In this lamp, a weld seam or an adhesive seam inseperably connects an essentially U-shaped front housing part, which is configured as a transparent clear lens, to a back panel in order to provide a closed, watertight housing within which at least one illuminant is arranged. To this end, the housing components can be made of hard plastics, preferably polymethyl methacrylate (PMMA) or plastics of this family. The back panel can also be made of another plastic, such as polycarbonate (PC), polybutylene terephthalate (PBT) or the like.

Another such lamp for vehicles is known from EP 1 852 306 B1, in which an illuminant and/or the outside and/or inside of a U-shaped front housing part features or feature a lens system, in the form of a surface texturing for example, for the focusing, parallel direction or scattering of the emitted light.

The construction of these known lamps is expensive. In addition, welding processes negatively affect the tolerances of adjacent clearances. The necessity of a weld seam or adhesive seam also limits the design of the lamps, as a blinker in a side-view mirror arrangement of a vehicle for example.

DE 10 2011 103 200 A1 discloses a light window for an illuminated unit in a side-view mirror arrangement, wherein the light window fits the outer contour of the housing of the side-view mirror arrangement and seals an opening in the housing of the side-view mirror arrangement. To this end the light window serves as a light conductor and features outcoupling structures at least on one area. For this purpose, the light window is produced out of an optical film which has a molded coating and is configured as a light conductor, wherein the optical film contains at least one outcoupling structure. A crystal-clear base material or alternatively a colored transparent material can be used for production, and it can be produced in a single extrusion die. To produce the light window, the optical film, which can be a PC film, is placed into the extrusion die so that a protective layer is injected on the die side of the film and the coating, which can consist of PC or PMMA, is injected on the core side of the film.

Molding a coating on a film to produce a light window, such as a blinker, is complicated, particularly since a fastening on a housing is also needed.

The object of the present invention is to deliver a method for the manufacture of a lamp for vehicles that overcomes the disadvantages of the state of the art. In particular, the lamp should be easy to manufacture and offer large freedom of design with high light yield.

This objective is accomplished by a method for manufacturing a lamp for vehicles in which a housing, a light conductor, and a clear lens are produced as one unit out of plastic in a 3-component injection procedure, wherein the refractive index of the plastic of the clear lens is selected to be different from the refractive index of the plastic of the light conductor, the boundary between clear lens and the light conductor adjacent to it is formed with a structure and, because of the difference of the two refractive indexes and the structure at the given light admission on at least one light incoupling area at one end of the light conductor, light outcoupling areas are defined along the extent of the light conductor and out of the lamp.

To this end, the injection process proceeds in 3 phases, wherein the plastic of the 3 components determines the sequence in which the 3 components are manufactured, in that the plastic with the highest melting point is injected first, then the plastic with the middle melting point and finally the plastic having the lowest melting point.

With the invention, it is also proposed that at least one light conditioning area, such as for tinting, dying, reflecting, scattering or the like, be introduced into the light conductor and/or clear lens by choosing at least one additive for the respective plastic.

According to the invention, the housing can be formed with a recess to build an installation space for at least one illuminant, wherein the recess is sealed, together with all plug boxes, preferably with a lid after the illuminant has been inserted into the installation space.

Furthermore, it can be provided that the illuminant be supplied via at least one LED on a printed circuit board, and/or that the at least one light incoupling area be supplied at the end of the light conductor facing the installation space.

It is also proposed that the light conductor be enclosed by the housing and the clear lens, wherein the cross sections of the housing and clear lens essentially perpendicular to the longitudinal extent of the lamp be determined as a function of the cross section of the light conductor essentially perpendicular to the longitudinal extent of the lamp, and/or that the cross section of the housing essentially perpendicular to the longitudinal extent of the lamp comprises a U-shape.

Moreover the surface of the light conductor can be produced polished high glaze.

The invention also delivers a side-view mirror arrangement of a vehicle having a lamp that is manufactured in a method according to the invention.

To this end, the surface of the clear lens can be shaped as a function of the type of lamp and/or the type of vehicle, wherein the lamp preferably comprises a blinker or is configured as a blinker.

It is finally yet proposed that light rays from the illuminant be subjected to a total reflection at the boundary between the light conductor and the clear lens outside the light outcoupling areas.

The lamp manufactured according to the invention enables a selective provision of light outcoupling areas and thus in particular a uniform distribution of light along the lamp along with freedom of design, since the housing, the light conductor and the clear lens are injection molded in desired shape as one unit, because of the refractive indexes of the plastics of the light conductor and the clear lens, a total reflection is adjusted at the boundary between them, and the light outcoupling areas are introduced only because of the structuring of the boundary in same.

Additionally, component tolerances are low and light yield is high due to the injection molding. The light yield can still be adjusted by dying or the like of the light conductor. Providing the light conductor with surfaces polished high glaze can furthermore prevent unintentional light leakage and/or an unintentional absorption of light.

Further advantages and features of the invention arise from the description of preferred embodiment examples of the invention below in reference to the enclosed figures.

The drawing shows:

FIG. 1 a housing, a light conductor and a clear lens of a lamp produced according to the invention;

FIG. 2 the light from FIG. 1 as a unit in longitudinal section;

FIG. 3 a cross-sectional view along the line A-B in FIG. 2;

FIG. 4 a part of an alternative lamp in longitudinal section; and

Figure 5:
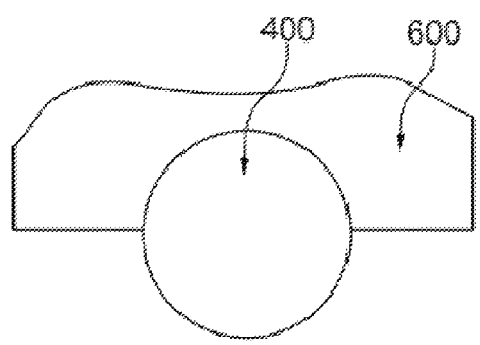

FIG. 5 a cross-sectional view along the line A-B in FIG. 4.

As illustrated in FIG. 1, a lamp 10 manufactured according to the invention comprises a housing 20, a light conductor 40 and a clear lens 60. These three components are manufactured in an injection molding process. For example, the light conductor 40 can be produced out of PC in a first phase, the clear lens 40 out of PMMA, crystal-clear or tinted, in a second phase and the housing 20 out of ABS (acrylonitrile-butadiene-styrene) in a third phase, so that one unit arises, as depicted in FIGS. 2 and 3 for example, in longitudinal section and cross-section respectively.

To be precise, the housing 20 is formed with a back panel 22 and two webs 24 and 26 to receive the light conductor 40 between the webs 24 and 26 on the back panel 22. In addition, a recess 28, which builds an installation space 30 for an unillustrated illuminant, is provided in the housing 20. The illuminant can comprise an LED on a printed circuit board; and the installation space 30 together with all plug boxes can be sealed by a lid 32.

The light conductor 40 features one end having at least one light incoupling area 42 adjacent to the installation space 30. Its surface, which borders lower surface of the clear lens 60, can be provided with a lens system 44, which provides the total reflection areas 46 and outcoupling area 48 for the light that enters the light conductor 40 at each incoupling area 42, not only because the clear lens 60 is formed with a corresponding lens system 62 on its surface opposite the lens system 44 of the light conductor 40, but also because the refractive indexes of the plastics of the clear lens 60 and of the light conductor 40 differ in such a manner that total reflection at the outcoupling areas 48 is excluded.

The optical path within a lamp produced according to the invention will be explained in more detail below in reference to FIGS. 4 and 5. They illustrate a lamp 100 which basically differs from the lamp 10 due to another geometry for the light. Whereas the light conductor 40 of the lamp 10 is shaped rectangular in cross section to be enclosed between the back panel 22 and the webs 24 and 26 of the housing 20 and the clear lens 60, the light conductor 400 of the lamp 100 is configured circular in cross section as seen in FIG. 5. Of course, the shape of the housing 200 and on the clear lens 600 of the lamp 100 of FIGS. 4 and 5 is also adapted to this circular shape.

The housing 200 is again configured into an installation space 300 for an unillustrated illuminant by means of a recess 230.

The light conductor 400 in turn again features incoupling areas 420 for light rays from the illuminant, these light rays propagating in the form of the light rays 700 in the light conductor 400 in order to be deflected into the total reflecting light rays 710 at the total reflection areas 420 and into the light rays 720 leaving the lamp 100 at the outcoupling areas 480.

The shape of the clear lens 600 is adapted not only to the shape of the light conductor 400, but can also satisfy any design requirements on the lamp 100. For example, the surface can feature a wave form as illustrated in FIG. 5.

The features of the invention disclosed in the above description, in the claims and in the Figures can be essential for realizing the invention in its various embodiments both individually and in any desired combination.

LIST OF REFERENCE CHARACTERS 10 lamp
20 housing
22 back panel
24 web
26 web
28 recess
30 installation space
32 lid
40 light conductor
42 incoupling area
44 lens system
46 total reflection area
48 outcoupling area
60 clear lens
62 lens system
100 lamp
200 housing
280 recess
300 installation space
400 light conductor
420 incoupling area
460 total reflection area
480 outcoupling area
600 clear lens
700 light ray
710 light ray
720 light ray

The invention claimed is:

1. A method of manufacturing a lamp for vehicles in which a housing, a light conductor and a clear lens are produced as one unit out of plastic in a 3-component injection procedure, wherein the refractive index of the plastic of the clear lens is selected to be different from the refractive index of the plastic of the light conductor, the boundary between clear lens and the light conductor adjacent to it is formed with a structure, and, because of the difference of the two refractive indexes and the structure at the given light admission on at least one light incoupling area at one end of the light conductor, light outcoupling areas are defined along the extent of the light conductor and out of the lamp.

2. The method according to claim 1 wherein the injection process proceeds in 3 phases, wherein the plastic of the housing, the light conductor and the clear lens determines the sequence in which the housing, the light conductor and the clear lens are manufactured, in that the plastic with the highest melting point is injected first, then the plastic with the middle melting point and finally the plastic having the lowest melting point.

3. The method according to claim 1 wherein at least one light conditioning area, for tinting, dying, reflecting, scattering, is introduced into the light conductor and/or clear lens by choosing at least one additive for the respective plastic.

4. The method according to claim 1 wherein the housing is formed with a recess to build an installation space for at least one illuminant, wherein the recess is sealed, together with all plug boxes, with a lid after the illuminant has been inserted into the installation space.

5. The method according to claim 4 wherein the illuminant is supplied via at least one LED on a printed circuit board, and/or that the at least one light incoupling area is supplied at the end of the light conductor facing the installation space.

6. The method according to claim 1 wherein the light conductor is enclosed by the housing and the clear lens, wherein the cross sections of the housing and clear lens essentially perpendicular to the longitudinal extent of the lamp are determined as a function of the cross section of the light conductor essentially perpendicular to the longitudinal extent of the lamp, and/or that the cross section of the housing essentially perpendicular to the longitudinal extent of the lamp comprises a U-shape.

7. The method according to claim 1 wherein the surface of the light conductor is produced as a polished high glaze surface.

8. A side-view mirror arrangement of a vehicle having a lamp that is manufactured in a method according to claim 1.

9. Side-view mirror arrangement according to claim 8 wherein the surface of the clear lens is shaped as a function of the type of lamp and/or the type of vehicle, wherein the lamp comprises a blinker or is configured as a blinker.

10. Side-view mirror arrangement according to claim 8 wherein the light rays from an illuminant are subjected to a total reflection at the boundary between the light conductor and the clear lens outside the light outcoupling areas.

* * * * *